United States Patent [19]
Jarman

[11] Patent Number: 5,975,608
[45] Date of Patent: Nov. 2, 1999

[54] APPARATUS FOR EXTENDING VEHICLE CARGO AREAS

[76] Inventor: E. Robert Jarman, 15432 E. Ray Rd., Gilbert, Ariz. 85296

[21] Appl. No.: 09/228,365

[22] Filed: Jan. 11, 1999

Related U.S. Application Data

[62] Division of application No. 08/902,379, Jul. 29, 1997, Pat. No. 5,857,724.

[51] Int. Cl.$^6$ ................................................. B62D 33/02
[52] U.S. Cl. .......................................................... 296/26.11
[58] Field of Search ........................................... 296/26.11

[56] References Cited

U.S. PATENT DOCUMENTS

| | | | |
|---|---|---|---|
| 2,872,239 | 2/1959 | Bowness et al. | 296/26 |
| 4,023,850 | 5/1977 | Tillery | 296/26 |
| 4,472,639 | 9/1984 | Bianchi | 296/26 |
| 4,531,773 | 7/1985 | Smith | 296/26 |
| 4,778,213 | 10/1988 | Palmer | 296/26 |
| 4,932,703 | 6/1990 | Chamberlin et al. | 296/26 |
| 4,950,123 | 8/1990 | Brockhaus | 414/522 |
| 5,052,878 | 10/1991 | Brockhaus | 414/522 |
| 5,154,470 | 10/1992 | Bringman, Jr. | 296/26 |
| 5,441,324 | 8/1995 | Gold | 296/26.11 |
| 5,456,511 | 10/1995 | Webber | 296/26 |
| 5,468,038 | 11/1995 | Sauri | 296/26 |
| 5,478,130 | 12/1995 | Matulin et al. | 296/57.1 |
| 5,533,771 | 7/1996 | Taylor et al. | 296/26 |

*Primary Examiner*—Gary C. Hoge
*Attorney, Agent, or Firm*—Dilworth & Barrese

[57] ABSTRACT

Apparatus for extending a vehicle cargo area is provided which includes a main panel having a first end adapted for pivotally attaching to a tailgate, the main panel including non-planar sections formed therein; and a pair of side panels pivotally attached to opposite sides of the main panel, the side panels including non-planar sections formed therein, wherein the apparatus is positionable in a stowed position having the side panels folded into abutment with the main panel such that the non-planar sections of the side panels nest with the non-planar sections of the main panel. Also provided is an apparatus for extending the vehicle cargo area of a vehicle is provided for a vehicle having a side-swing style tailgate having a first end and a second end, the first end pivotally mounted to a vehicle body, the apparatus including a main panel having a first end and a second end, the first end pivotally mountable to the second end of the side-swing tailgate, the main panel having an operative position at about a right angle with the side-swing tailgate and a closed position abutting the side-swing tailgate; a side panel having a first end pivotally mounted to the second end of the main panel, the side panel having an operative position at about a right angle from the main panel, and a closed position abutting the main panel; the side panel having a second end attachable to the vehicle; and a floor panel disposed within the area defined by the side-swing tailgate, the side panel, the main panel and the vehicle when the apparatus is in the operative position.

7 Claims, 10 Drawing Sheets

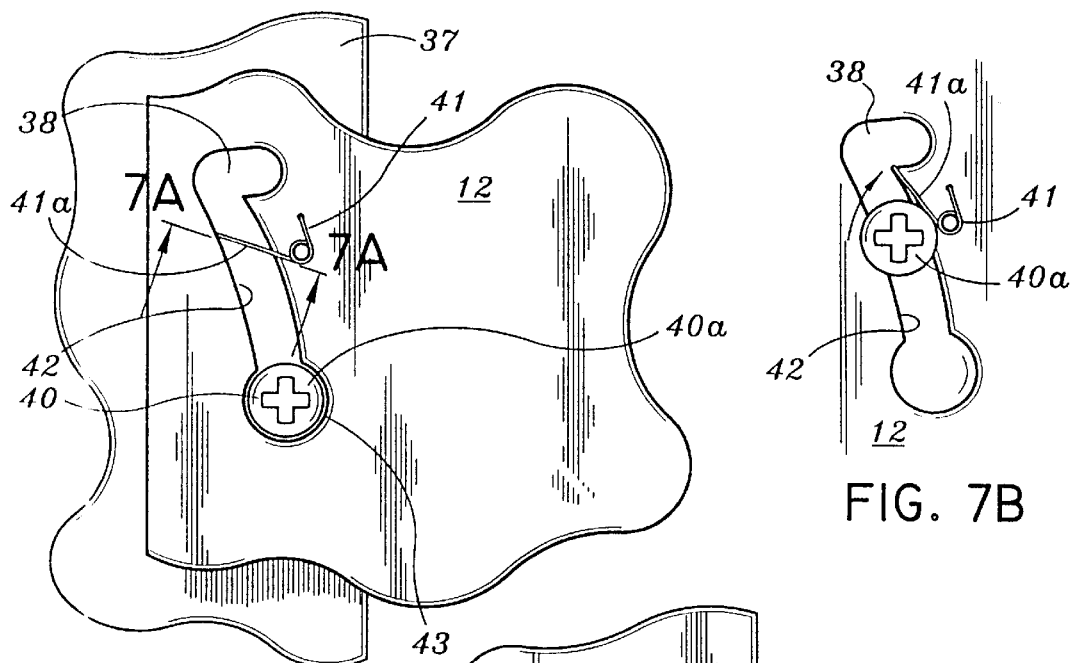
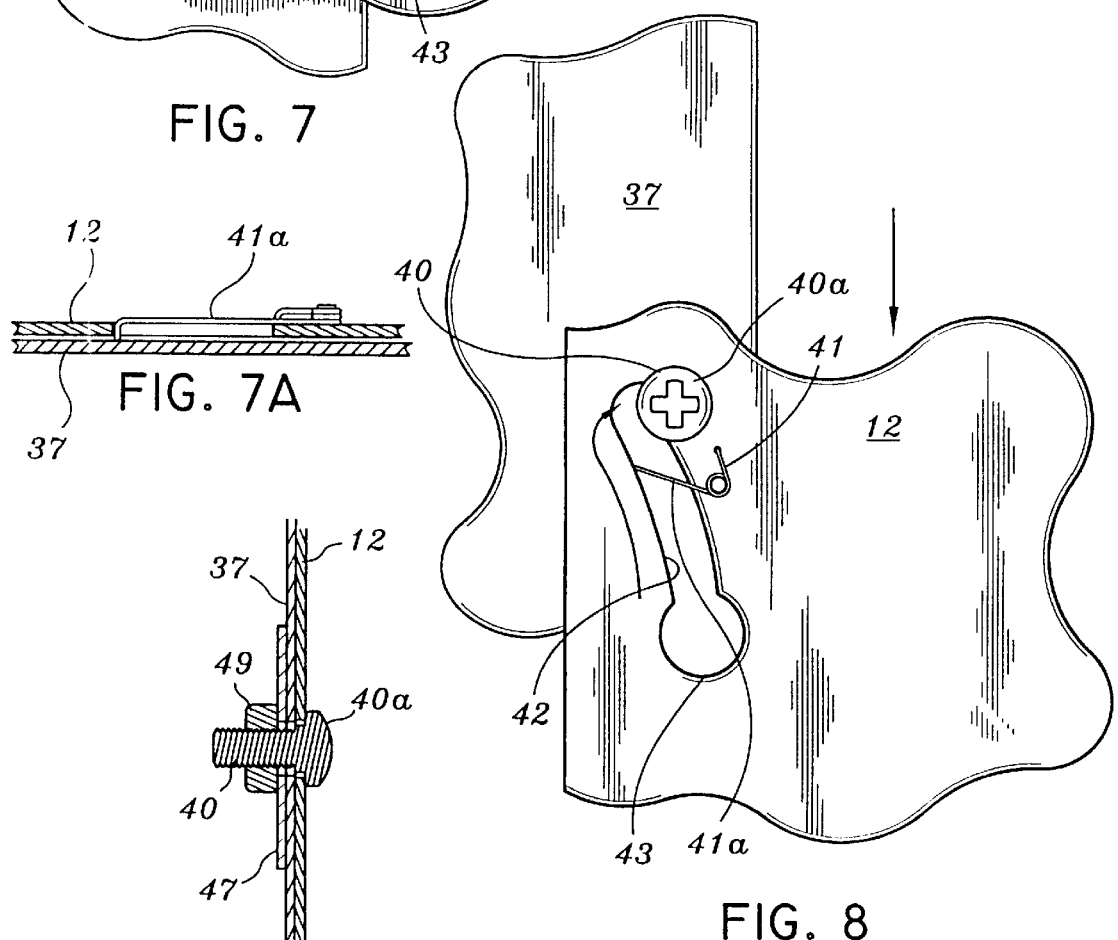
FIG. 7
FIG. 7A
FIG. 7B
FIG. 8
FIG. 9

5,975,608

APPARATUS FOR EXTENDING VEHICLE CARGO AREAS

CROSS REFERENCE TO RELATED APPLICATIONS

This application is a divisional of U.S. patent application Ser. No. 08/902,379 filed Jul. 29, 1997, now U.S. Pat. No. 5,857,724, the entire contents of which are hereby incorporated by reference.

BACKGROUND

1. Technical Field

The present disclosure relates to an apparatus for extending vehicle cargo areas. In particular, the present disclosure relates to an easily storable assembly of a cargo area extending apparatus that is adaptable to either drop-down or side-swing tailgates.

2. Description of Related Art

It is common to provide drop-down and side-swing type tailgates for motor vehicles, for example, trucks, station wagons, etc. Such vehicles can be used for moving a wide variety of objects. On occasion, the cargo area may be insufficient in size to carry a desired object. In these situations, some individuals may leave the tailgate open and let the object extend beyond the length of the horizontal gate, or in the case of a side-swing gate, the end of the vehicle cargo area. In such instances, the objects are susceptible to falling out of the vehicle creating a hazard to other vehicles on the road.

Previous attempts have been made to extend vehicle cargo areas. For example, U.S. Pat. Nos. 2,872,239 to Bowness et al.; 4,531,773 to Smith; 4,778,213 to Palmer; 5,468,038 to Sauri; and 5,478,130 to Matulin et al., disclose various extending devices for fold-down type tailgates. However, none of these devices features a streamlined apparatus that will not add significantly to the overall thickness of the tailgate assembly itself and which maintain optimum structural integrity of the various components which make up the assembly.

Accordingly, there exists a need for an improved vehicle tailgate extending apparatus to extend the length of the cargo area and allow for the safe transport of objects larger then the original cargo area size while maintaining optimum structural integrity of the overall apparatus. Such an improved apparatus, when installed on a vehicle compliments the existing tailgate assembly geometry so as to appear as though the vehicle has not been modified significantly from the factory condition. Further, there exists a need for a tailgate extending apparatus which is simple to set up and to stow when not in use.

SUMMARY

The present disclosure provides an apparatus for extending a vehicle cargo area, which overcomes the above-noted disadvantages of previous cargo area extenders. Additionally, the present disclosure satisfies the need for a cargo area extending apparatus which is simple to install and readily stows to a position which does not significantly alter the aesthetic appearance of the standard drop or side-swing tailgate assemblies.

One particular embodiment of the present disclosure provides an apparatus for extending a vehicle cargo area which includes a main panel having a first end adapted for pivotally attaching to a tailgate, the main panel including non-planar sections formed therein; and a pair of side panels pivotally attached to opposite sides of the main panel, the side panels including non-planar sections formed therein, wherein the apparatus is positionable in a stowed position having the side panels folded into abutment with the main panel such that the non-planar sections of the side panels nest with the non-planar sections of the main panel.

The embodiment may also include a locking mechanism configured and dimensioned to maintain the side panels in the stowed position. One such locking mechanism preferably includes an extended portion mounted to a second end of the main panel, the extended portion overhanging the side panels in the closed position, the extended portion having a lower surface, the side panels each having an extended portion with an upper surface; and a bias member rigidly mounted to the lower surface of the main panel extended portion; the upper surface of the extended portion of the side panels being configured and dimensioned to receive the bias member thereby securing the side panels in the stowed position.

Preferably, a pair of extended braces are provided and are connectable between the main panel and a portion of the vehicle body such that the main panel becomes secured in an orientation outwardly away from the tailgate and substantially parallel thereto.

In an alternative embodiment, an apparatus for extending the vehicle cargo area of a vehicle is provided for a vehicle having a side-swing style tailgate having a first end and a second end, the first end pivotally mounted to a vehicle body, the apparatus including a main panel having a first end and a second end, the first end pivotally mountable to the second end of the side-swing tailgate, the main panel having an operative position at about a right angle with the side-swing tailgate and a closed position abutting the side-swing tailgate; a side panel having a first end pivotally mounted to the second end of the main panel, the side panel having an operative position at about a right angle from the main panel, and a closed position abutting the main panel; the side panel having a second end attachable to the vehicle; and a floor panel disposed within the area defined by the side-swing tailgate, the side panel, the main panel and the vehicle when the apparatus is in the operative position.

Preferably, the floor panel is foldable for stowage. The floor panel may be made of several joined sections which permit compact folding and easy storage. In one configuration, the floor panel is corrugated to facilitate nestable folding thereof. Additionally, the floor panel, the side panel and the main panel may fold into the side-swing tailgate for stowage.

Preferably, a vehicle floor support is provided that is pivotally attached to the vehicle, the vehicle floor support having a stowed position and an open position.

In a further alternative embodiment, an apparatus for extending a vehicle cargo area is provided which includes a tailgate with an interior surface having a plurality of non-planar portions formed therein, the tailgate having a proximal end configured and dimensioned for attachment to a vehicle; a main panel having a first end and a second end, the main panel being pivotally mounted to the distal end of the tailgate; and a pair of side panels having a plurality of non-planar surfaces formed therein, the side panels being pivotally attached to opposite sides of the main panel; wherein the main panel is disposable in at least a stowed position adjacent the interior surface of the tailgate such that the non-planar portions of the main panel and the side panels nest within each other.

The main panel may include an extended portion overhanging the side panels when disposed in the stowed position. In such a configuration, the main panel extended portion preferably includes a lower surface and the side panels each further include an extended portion with an upper surface, the side panels moveable to a stowed position abutting the main panel.

BRIEF DESCRIPTION OF DRAWINGS

Various embodiments of the presently disclosed apparatus for extending vehicle cargo areas are disclosed herein with reference to the drawings wherein:

FIG. 7 is a partial view which shows the locking mechanism for the side panel members;

FIG. 7A is a cross-sectional view taken along section line 7A—7A of FIG. 7;

FIG. 7B is a view showing the operational locking of the side panel to the vehicle side wall;

FIG. 8 is a view similar to FIG. 7, which shows the operation of the side panel locking mechanism;

FIG. 9 is a cross-sectional view taken along section line 9—9 of FIG. 8;

DETAILED DESCRIPTION OF PREFERRED EMBODIMENTS

Figure 1:
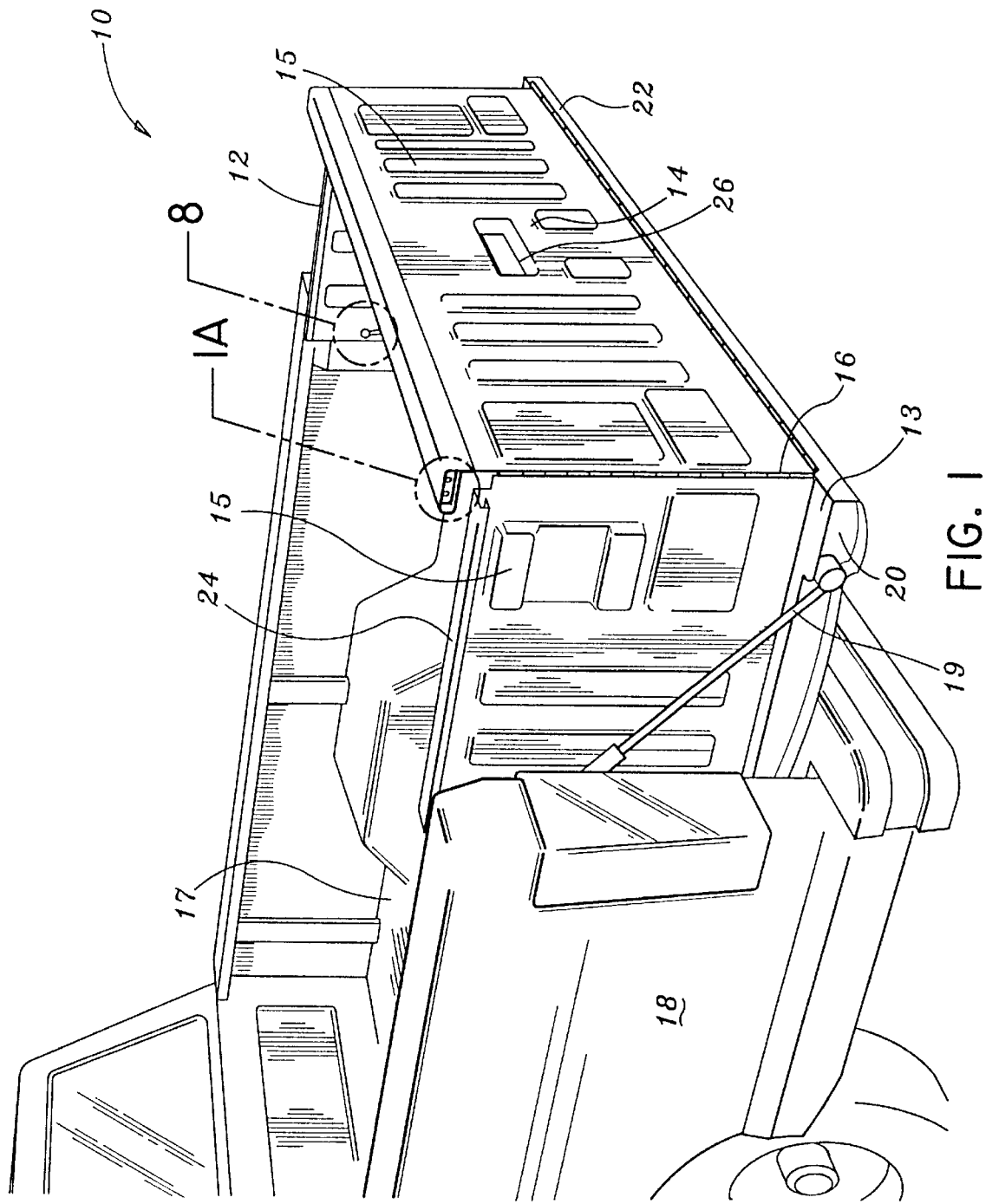
FIG. 1 is a perspective view of a first embodiment of the cargo area extending apparatus constructed in accordance with the present disclosure as installed on a truck with a drop-down style tailgate.

Referring now in specific detail to the drawings in which like reference numerals identify similar or identical elements throughout the several views, and initially to FIG. 1, one embodiment of an apparatus for extending vehicle cargo areas constructed in accordance with the present disclosure is shown generally as assembly 10. Assembly 10 is shown installed on tailgate 20 of vehicle 18, which may be an open bed truck, sport utility vehicle, etc. Tailgate 20 is supported by strut braces 19 on opposite sides of tailgate 20. Generally, assembly 10 defines an increased cargo area 17. Increased cargo area 17 remains enclosed by side panels 12 and 24 and a main panel 14.

Figure 2A:
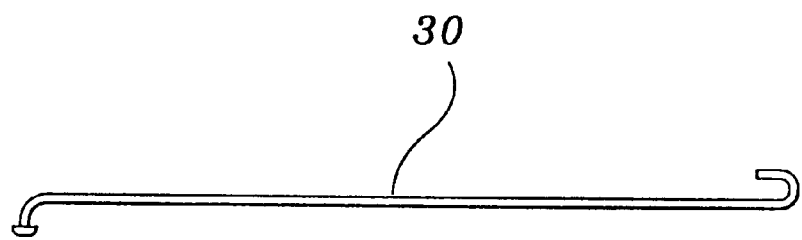
FIG. 2A is a side view of an extended strut member of the embodiment of FIG. 1.
Figure 2:
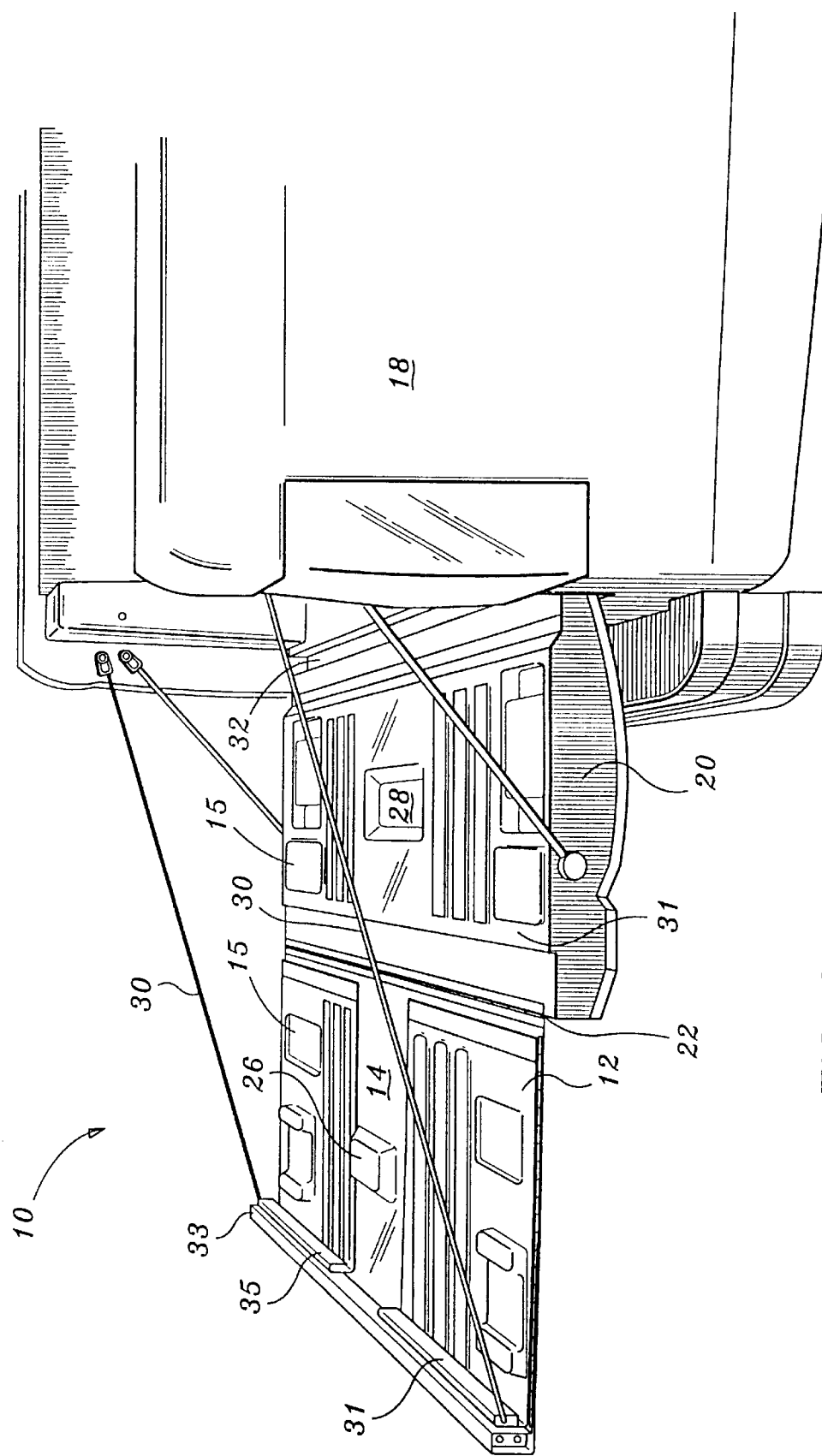
FIG. 2 is a perspective view of the embodiment of FIG. 1, which shows one operational configuration of the cargo area extending apparatus.
Figure 3:
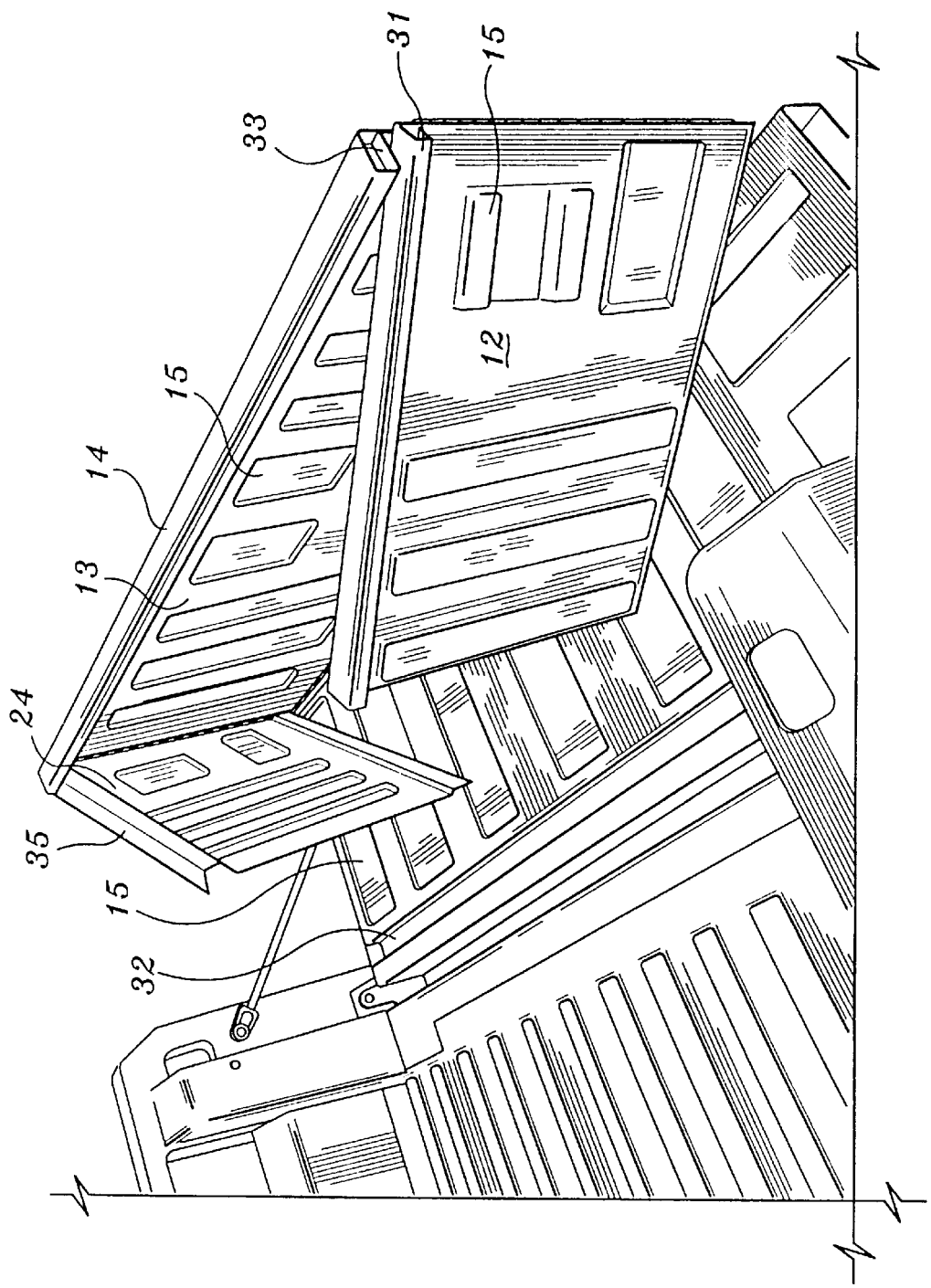
FIG. 3 is a partial perspective view of the embodiment of FIG. 1, which shows the t various panels which make-up the cargo area extending apparatus.

Referring now to FIGS. 2 and 3, main panel 14 can be rotated to a horizontal position and supported by extended strut braces 30. This embodiment enables the vehicle operator to carry objects too long for both the cargo area 17 and tailgate 20. Assembly 10 includes a cargo area 17 having main panel 14 hinged to a distal end of the tailgate 20. Side panels 12 and 24 are hingedly connected to the opposite ends of the main panel 14 and held generally parallel with respect to each other when in the open position.

The top of main panel 14 has an extended portion 33 connected thereto and extending away from an interior surface 13 of main panel 14. Side panels 12 and 24 also have an extended portion 31 and 35 attached thereto, respectively and facing away from one another in the open position. Extended portions 31 and 35 of side panels 12 and 24 fit below extended portion 33 of main panel 14 to allow for easier stowage of assembly 10 when not in use. A recessed trough 32 is formed on tailgate 20 to accept extended portions 31, 33 and 35 of main panel 14 and side panels 12 and 24. An opening 26 is provided in the main panel 14 to access a tailgate release lever area 28.

Figure 4:
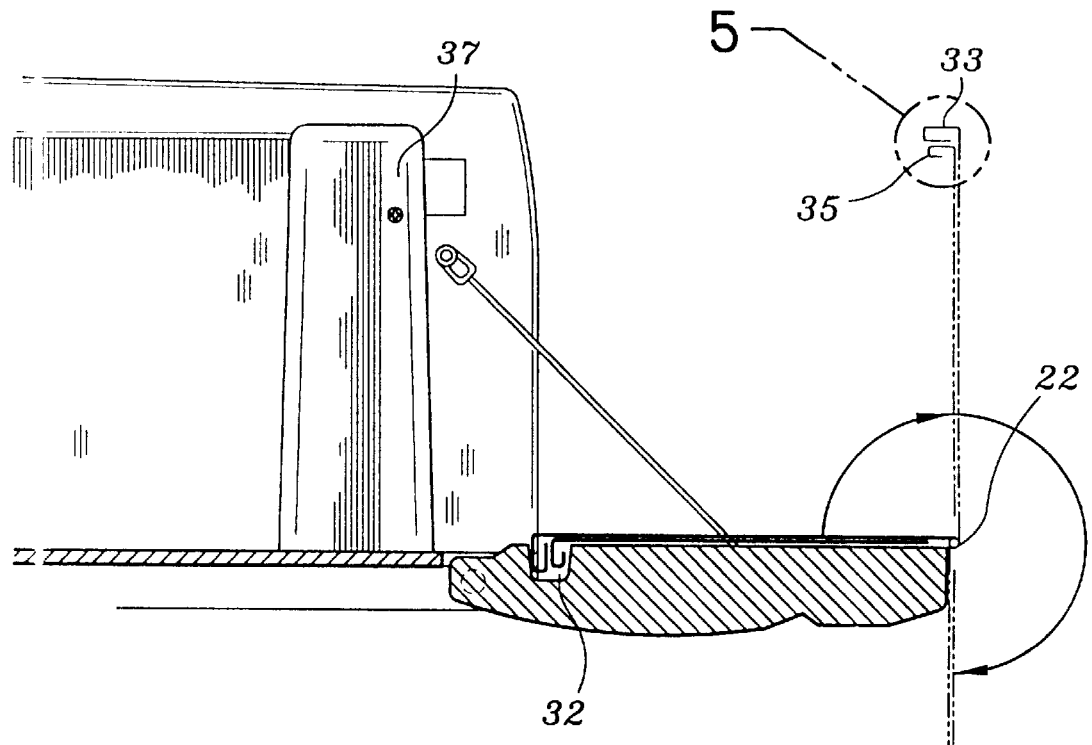
FIG. 4 is a side cross sectional view of the embodiment of FIG. 1, which shows the pivotal range of motion of the main panel section.

Referring to FIG. 4, a piano hinge 22 mounts main panel 14 to the top of tailgate 20, to permit at least 270 degrees of rotation as shown. This permits the user to load the cargo area 17, secure the cargo or use main panel 14 as a ramp to assist loading.

Figure 5:
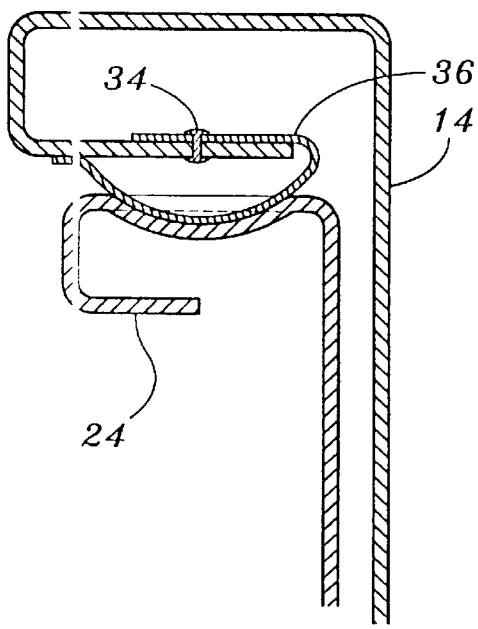
FIG. 5 is an enlarged cross-sectional view of the locking mechanism for stowing of the panel members in a locked position.
Figure 6:
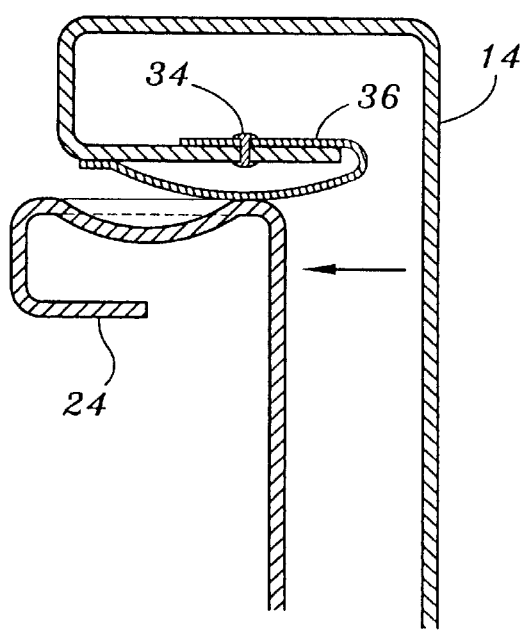
FIG. 6 is a view similar to FIG. 5, which shows movement of the panel toward the released position.

Referring to FIGS. 5 and 6, a locking mechanism 45 includes a compliant arcuately shaped spring 36 which is rigidly mounted to a lower surface of extended portion 33 of main panel 14 by, for example, a rivet 34. Spring 36 extends over the length of main panel 14 or at least a portion thereof. An upper surface of extended portions 31 and 35 of side panels 12 and 24 is curved to receive spring 36. Spring 36 passes over a curved portion of the upper surfaces of side panels 12 and 24 and expands to lock side panels 12 and 24 in place.

The stowed position of side panels 12 and 24 is flush against interior surface 13. Main panel 14 and side panels 12 and 24 have corresponding depressions 15 formed therein. Depressions 15 in side panels 12 and 24 conform to depressions 15 in main panel 14. Depressions 15 in main panel 14 and side panels 12 and 24 conform to depressions 15 in tailgate 20. Depressions 15 create a non-planar structure for main panel 14 and side panels 12 and 24 thereby increasing the mechanical strength an integrity of the panels. Since depressions 15 conform, they nest together reducing the amount of space needed for stowage. The side panels 12 and 24 and main panel 14 nest in such way that when stowing assembly 10 onto tailgate 20, the stacking thickness is substantially the thicknesses of the two panels and depressions 15.

Figure 1A:
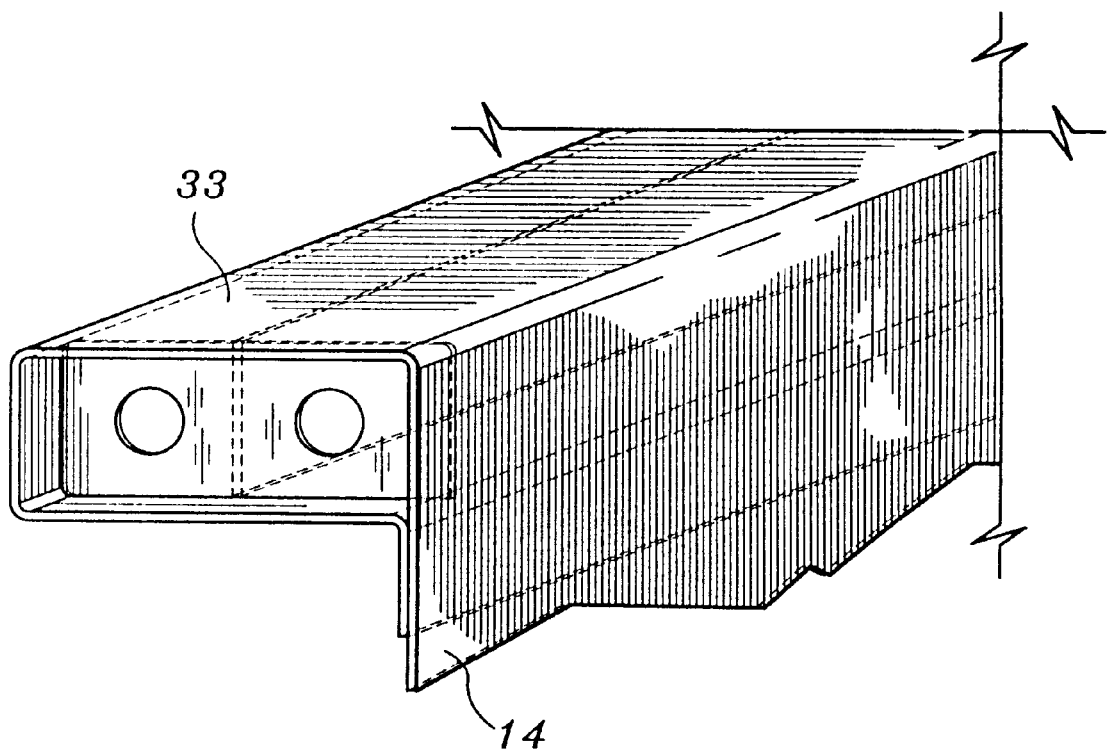
FIG. 1A is an enlarged view of the area of detail indicated in FIG. 1.

This feature also occurs as a result of extended portions 31, 33, and 35 being received in a trough 32. Extended portion 33 of main panel 14 could also be used as a stowage volume for extended strut braces 30. FIG. 1A shows extended portion 33 adapted to receive extended strut braces 30 therein. Extended portion 33 may secure extended strut braces 30 by, for example, magnetic attraction.

Referring now to FIGS. 7–9, side panels 12 and 24, once opened, are secured to the vehicle by a locking assembly. FIGS. 7–9 illustrate the locking assembly for side panel 12. The locking assembly for side panel 24 is identical and, therefore, will not be separately illustrated or described herein. The locking assembly includes a shoulder bolt 40 mounted to an interior panel 37 of the vehicle's cargo area 17. Side panel 12 has a hole 43 formed therein to receive shoulder bolt 40. Shoulder bolt 40 is moved through a slot 42 formed in side panel 12 and intersecting hole 43 to allow the shaft of shoulder bolt 40 to pass while securing side panel 12 in the open position. Bolt head 40a is configured and dimensioned to pass through hole 43.

The operational sequence of the locking assembly is illustrated in FIGS. 7, 7B and 8. Side panel 12 is opened and hole 43 aligned with shoulder bolt head 40a. Side panel 12 is pushed toward interior panel 37 so that shoulder bolt head 40a passes through hole 43. Side panel 12 is then urged downwardly so that slot 42 travels along the shaft of shoulder bolt 40, as shown in FIG. 7B. The shaft contacts a leg portion 41a of a retaining member such as torsional spring 41 causing it to rotate and allow the shoulder bolt shaft to pass leg portion 41a in slot 42. The leg portion 41a snaps back to its original position once the shaft passes it. In this manner, side panel 12 is prevented from accidently becoming unlatched from the interior panel 37, for example in the event of the vehicle traveling over a bump. FIG. 8 shows shoulder bolt 40 in a secured position. A washer 47 and nut 49 may be provided to secure shoulder bolt 40 through interior panel 37.

Figure 10:
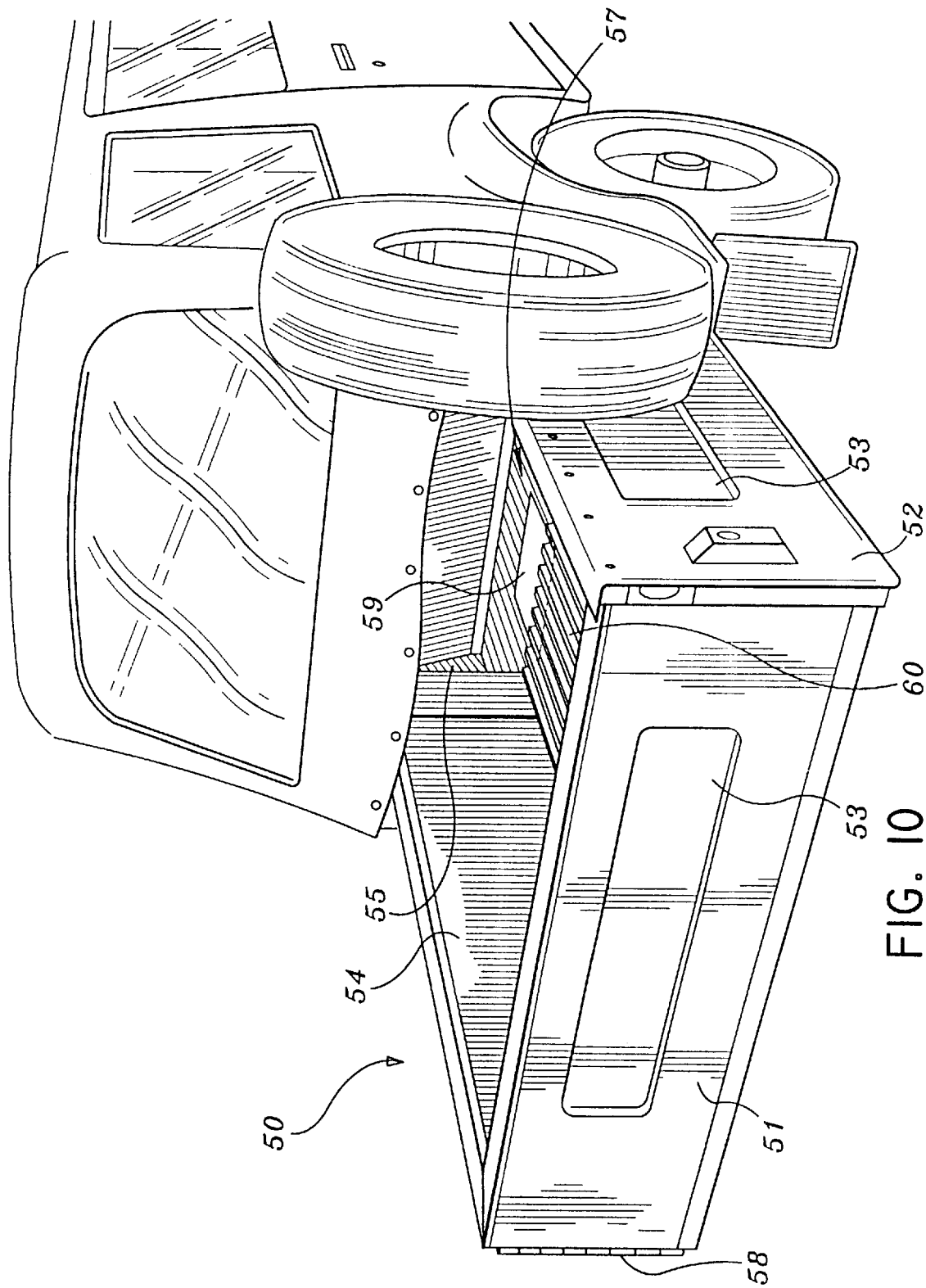
FIG. 10 is a perspective view of a second embodiment of the cargo area extending apparatus constructed in accordance with the present disclosure as installed on a truck with a side-swing style tailgate.

A further embodiment of the presently disclosed apparatus for extending vehicle cargo areas is shown in FIG. 10 as assembly 50. Assembly 50 is a cargo area extending apparatus for vehicles with a side-swing style tailgate such as tailgate 52. A main panel 51 is hingedly connected to the end of tailgate 52. A side panel 54 is hingedly connected to the opposite end of the main panel 51 and secures assembly 50 to the vehicle by attaching to wall 55. A corrugated floor panel 60 is disposed between the lower portion of the tailgate 52, side panel 54 and main panel 51 thereby creating an extended cargo area 57.

Figure 11:
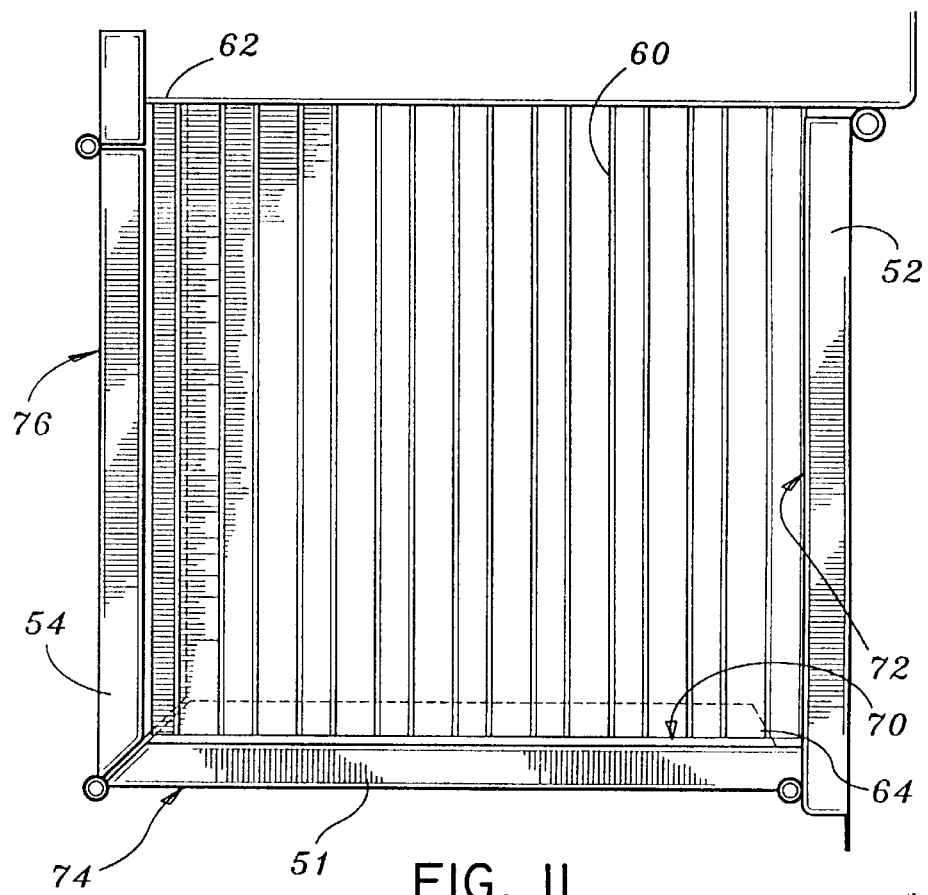
FIG. 11 is a top view of the embodiment of FIG. 10, which shows the cargo area extending apparatus in the fully assembled condition.
Figure 13:
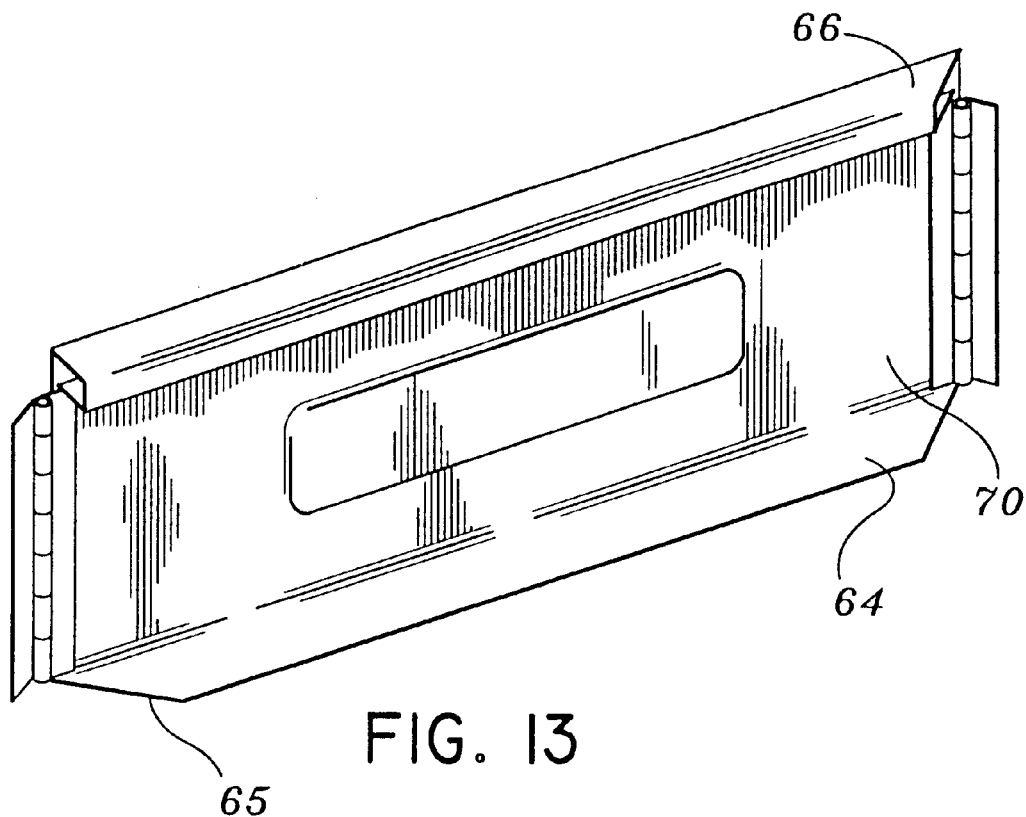
FIG. 13 is a perspective view of the panel of the embodiment of FIG. 10.

Referring to FIGS. 11 and 13, side panel 54 and main panel 51 have a pair of floor supports 62 and 64 on their lower portion facing inward to support a corrugated floor panel 60. Main panel floor support 64 includes a removable corner portion 65 and adjacent side panel floor support 62 includes a removable corner portion 63. Corner portions 65 and 63 are disposed opposite one another and are removable to prevent interference when the extended cargo area 57 is in use. A floor support 59 may be installed on the floor of cargo area 57 and be hinged to fold out when assembly 50 is in operation. Vehicle floor support 59 provides additional support for floor panel 60.

Figure 12:
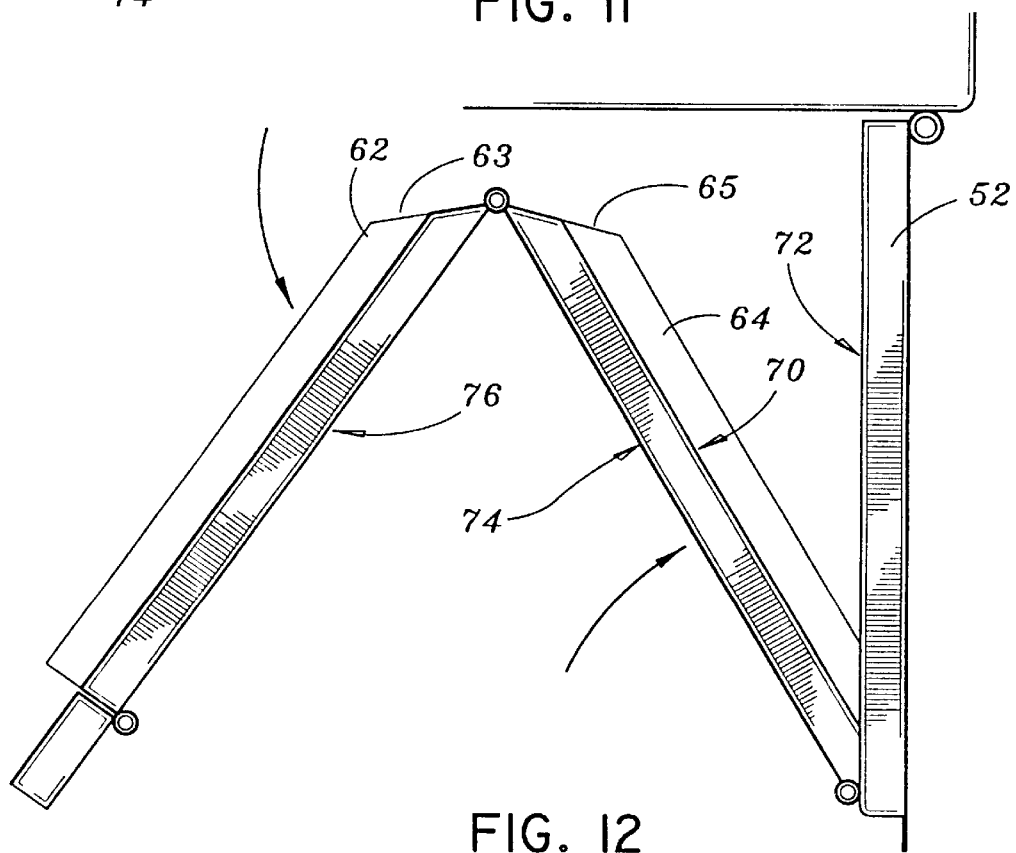
FIG. 12 is a top view of the embodiment of FIG. 10, which shows the operational movement of the sidewall panel members.
Figure 14:
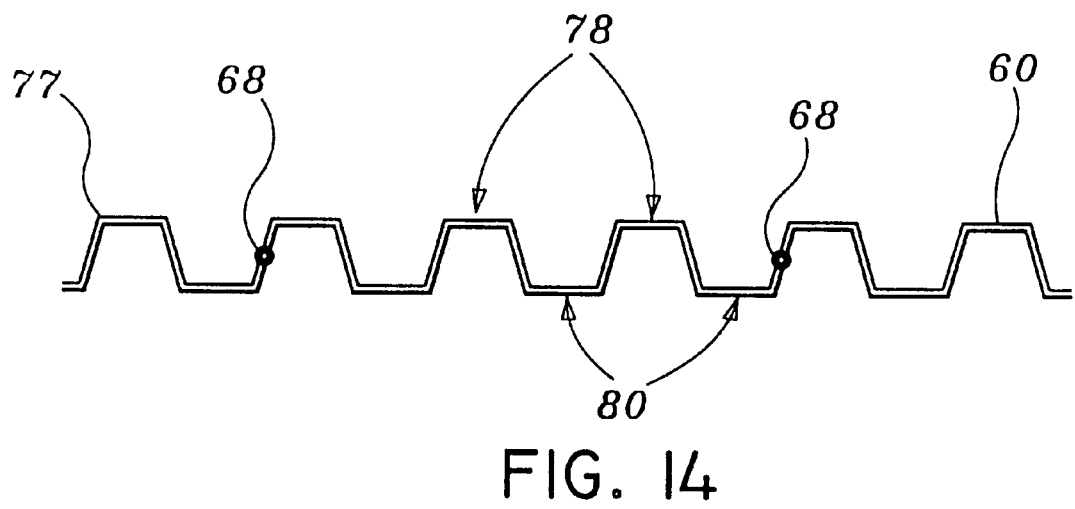
FIG. 14 is an end view of the corrugated floor panel in the open position.
Figure 15:
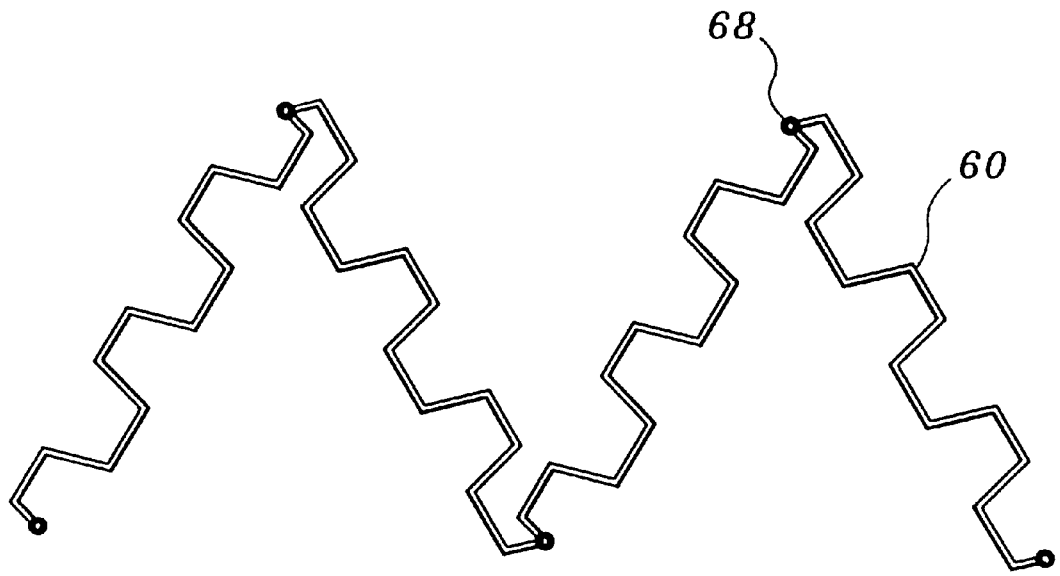
FIG. 15 is an end view of the corrugated floor panel in an intermediate position.
Figure 16:
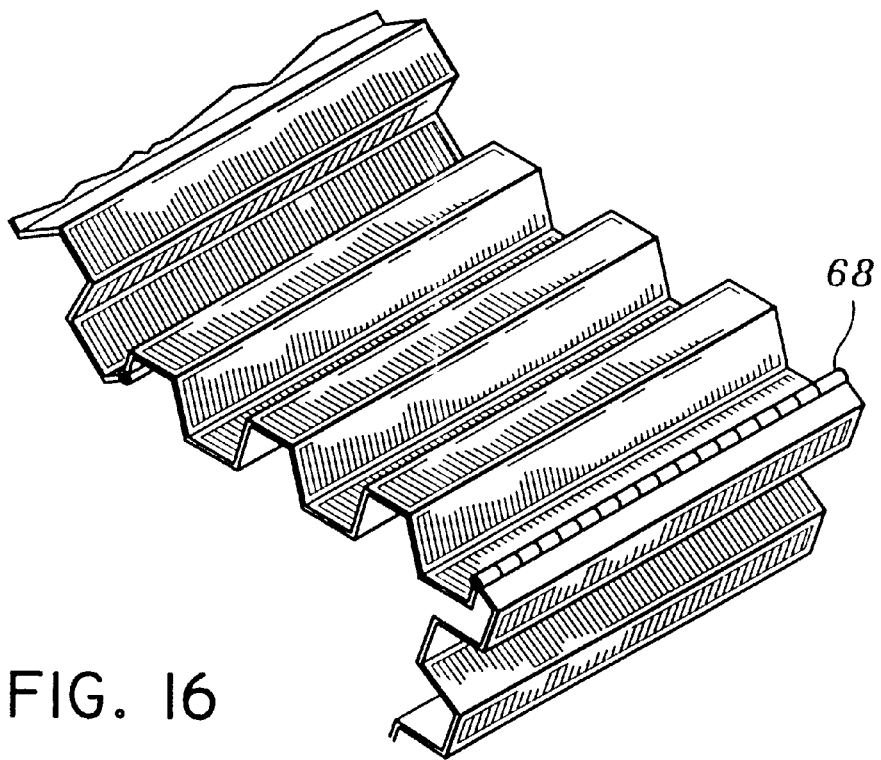
FIG. 16 is a perspective view of the corrugated floor panel.

Referring now to FIGS. 12 and 14–16, stowage of assembly 50 will now be described. Side panel 54 is detached from the vehicle. Main panel 51 folds inwardly until its interior surface 70 abuts interior surface 72 of the tailgate 52. Side panel 54 is folded toward tailgate 52 so that its exterior surface 76 is adjacent to an exterior surface 74 of main panel 51 as shown in FIG. 12. In addition, corrugated floor panel 60 folds on intermittently spaced hinges 68 extending the length of floor panel 60. Corrugated floor panel 60 folds from its open position, as shown in FIG. 14, so that corresponding corrugations nest together to form a compact arrangement which can easily be stored on tailgate 52. Corrugations 77 have peaks 78 and troughs 80. To achieve efficient nesting of corrugated floor panel 60, it is preferably divided into equal width sections, and hinge 68 is placed on floor panel 60 equidistant from adjacent peak 78 and trough 80. Corrugations 77 in the floor panel 60 are nested together and stowed prior to folding main panel 51 and side panel 54. Main panel 51 and side panel 54 have corresponding depressions 53 formed therein. When corrugated floor panel 60 is nested, side panel 54 and main panel 51 are folded together. The entire structure is compactly stowed within a recess (not shown) formed on tailgate 52.

It will be understood that various modifications can be made to the various embodiments of the presently disclosed apparatus for extending vehicle cargo areas without departing from the spirit and scope of the apparatus. For example, each of the disclosed embodiments might also include parking lights, brake lights, directional lights and reverse lights in the event the cargo area extension obscures any of the lights already in place. Therefore, the above description should not be construed as limiting the invention but merely as presenting the preferred embodiments of the invention. Those skilled in the art will envision other modifications within the scope and spirit of the presently disclosed embodiments of apparatus for extending vehicle cargo areas.

What is claimed is:

1. An apparatus for extending the vehicle cargo area of a vehicle having a side-swing style tailgate having a first end and a second end, the first end pivotally mounted to a vehicle body, which apparatus comprises:

a main panel having a first end and a second end, the first end pivotally mountable to the second end of the side-swing tailgate, the main panel having an operative position at about a right angle with the side-swing tailgate and a closed position abutting the side-swing tailgate;

a side panel having a first end pivotally mounted to the second end of the main panel, the side panel having an operative position at about a right angle from the main panel, and a closed position abutting the main panel;

the side panel having a second end attachable to the vehicle; and a floor panel disposed within the area defined by the side-swing tailgate, the side panel, the main panel and the vehicle when the apparatus is in the operative position.

2. An apparatus for extending a vehicle cargo area as recited in claim 1, wherein the floor panel is foldable for stowage.

3. An apparatus for extending a vehicle cargo area as recited in claim 1, wherein the floor panel, the side panel and the main panel fold into the side-swing tailgate for stowage.

4. An apparatus for extending a vehicle cargo area as in claim 2, wherein the foldable floor panel is corrugated.

5. An apparatus for extending a vehicle cargo area as recited in claim 4, wherein the foldable floor panel includes a plurality of sections.

6. An apparatus for extending a vehicle cargo area as recited in claim 5, wherein the plurality of sections are pivotally joined.

7. An apparatus for extending a vehicle cargo area as recited in claim 1, which further comprises a vehicle floor support pivotally attached to the vehicle, the vehicle floor support having a stowed position and an open position.

* * * * *